(12) United States Patent
Schneider (10) Patent No.: US 8,560,732 B2
(45) Date of Patent: Oct. 15, 2013

(54) PEER-TO-PEER OBJECT DISTRIBUTION

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 930 days.

(21) Appl. No.: 12/070,644

(22) Filed: Feb. 19, 2008

(65) Prior Publication Data

US 2009/0210484 A1 Aug. 20, 2009

(51) Int. Cl.
*G06F 15/16* (2006.01)

(52) U.S. Cl.
USPC .......................................... 709/248; 709/203

(58) Field of Classification Search
USPC .................................................. 709/203, 248
See application file for complete search history.

(56) References Cited

U.S. PATENT DOCUMENTS

| | | | |
|---|---|---|---|
| 7,191,290 B1 * | 3/2007 | Ackaouy et al. ............... | 709/219 |
| 7,571,119 B2 * | 8/2009 | Svendsen et al. ............ | 705/26.1 |
| 7,653,668 B1 * | 1/2010 | Shelat et al. .................. | 709/201 |
| 8,200,769 B2 * | 6/2012 | Wen et al. ..................... | 709/206 |
| 2003/0009518 A1 * | 1/2003 | Harrow et al. ................ | 709/203 |
| 2003/0220944 A1 * | 11/2003 | Schottland et al. ........... | 709/247 |
| 2005/0021615 A1 * | 1/2005 | Arnott et al. .................. | 709/203 |
| 2005/0216559 A1 * | 9/2005 | Manion et al. ................ | 709/205 |
| 2006/0075083 A1 * | 4/2006 | Liu .............................. | 709/223 |
| 2008/0115167 A1 * | 5/2008 | Hermsmeyer et al. .......... | 725/46 |

\* cited by examiner

*Primary Examiner* — Chau Le (74) *Attorney, Agent, or Firm* — Lowenstein Sandler LLP (57) ABSTRACT

Methods and systems for distributing objects over a network. In one embodiment, the system includes at least one primary network device, and multiple secondary network devices coupled to the primary network device via a network. The primary network device may receive, from a server, objects for the devices managed by the server. The secondary network devices may receive an identifier of the primary network device from the server and may request updates for objects deployed at individual secondary network devices from the primary network device.

20 Claims, 7 Drawing Sheets

FIG. 6 ns and may include a collection of rules to specify a security policy of a network device, a collection of configuration items to configures a device to perform application-specific tasks (e.g., collecting a particular status from a network), or other data items that a device needs to have for proper operations. Devices that receive data objects may be network appliances or any other devices in the network of an organization. Each device may be able to communicate with a server and with other devices in the network. In one embodiment, at least one network device functions as a primary network device for distributing data objects to the other network devices within the organization. In particular, a primary network device receives an organization's entire set of data objects from the server and handles its distribution among other network devices managed by the server. Every other network device assembles a list of data objects that it currently has and requests updates for these data objects from the primary network device. The primary network devices then responds with the differences between what the requesting device currently has and what it should have.

PEER-TO-PEER OBJECT DISTRIBUTION

TECHNICAL FIELD

Embodiments of the present invention relate to distribution of data over a network, and more specifically, to the management of data distributed as objects over a network.

BACKGROUND

Many devices can be configured and commanded over a network. For example, a network monitoring system can install configurable devices in the network to monitor network activities. Each configurable device can be configured over the network to collect status or event statistics of interest to a user. With hundreds of these devices and hundreds or thousands of events to monitor by each device, transmitting the configuration data over a network can consume significant amount of bandwidth. Occasionally, the transmission may take so long that it times out before completion. As another example, network security policies can be distributed as a collection of commands from one device to another. Transmission of a large number of commands over a network to a large number of devices also consumes a significant amount of bandwidth.

Conventionally, data distribution is generally initiated by a server. Data sent by the server usually includes a complete and detailed data file that enables a device to operate properly. When there is an update to the data file, the server would send the entire updated data file to the device. Generating the entire data file for ordinarily minor updates consumes server resources. Further, if there is a minor error in the transmission of the data file, the entire file needs to be re-sent over again. With multiple devices requesting data files from the server, the distribution of policy or configuration data can create a significant burden on network bandwidth and CPU availability.

One advantage of the techniques described herein is that the number of transmissions between the server and the client devices is reduced significantly. Instead of having each client device inquire about its data objects, all data objects are sent to a primary client device which then distributes them locally among the other devices. The primary client device does not transport the entire data file of a secondary device all at once, but rather only transmits the differences between what a secondary device currently has and what it should have. In a system of multiple devices with hundreds or thousands of data objects to deploy, the techniques described herein significantly reduce the bandwidth requirement for data distribution.

It is noted that the technique described herein is applicable to a policy propagation network that propagates policy objects to network entities. The technique can also be applied to a configuration management system in which configuration objects are distributed.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "comparing", "hashing", "main-

BRIEF DESCRIPTION OF THE DRAWINGS

The present invention is illustrated by way of example, and not by way of limitation, in the figures of the accompanying drawings and in which.

DETAILED DESCRIPTION

Described herein are methods and systems for distributing data objects among devices of an organization. A data object may be in the form of a file, document or any other set of data, taining", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more a specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 1A:
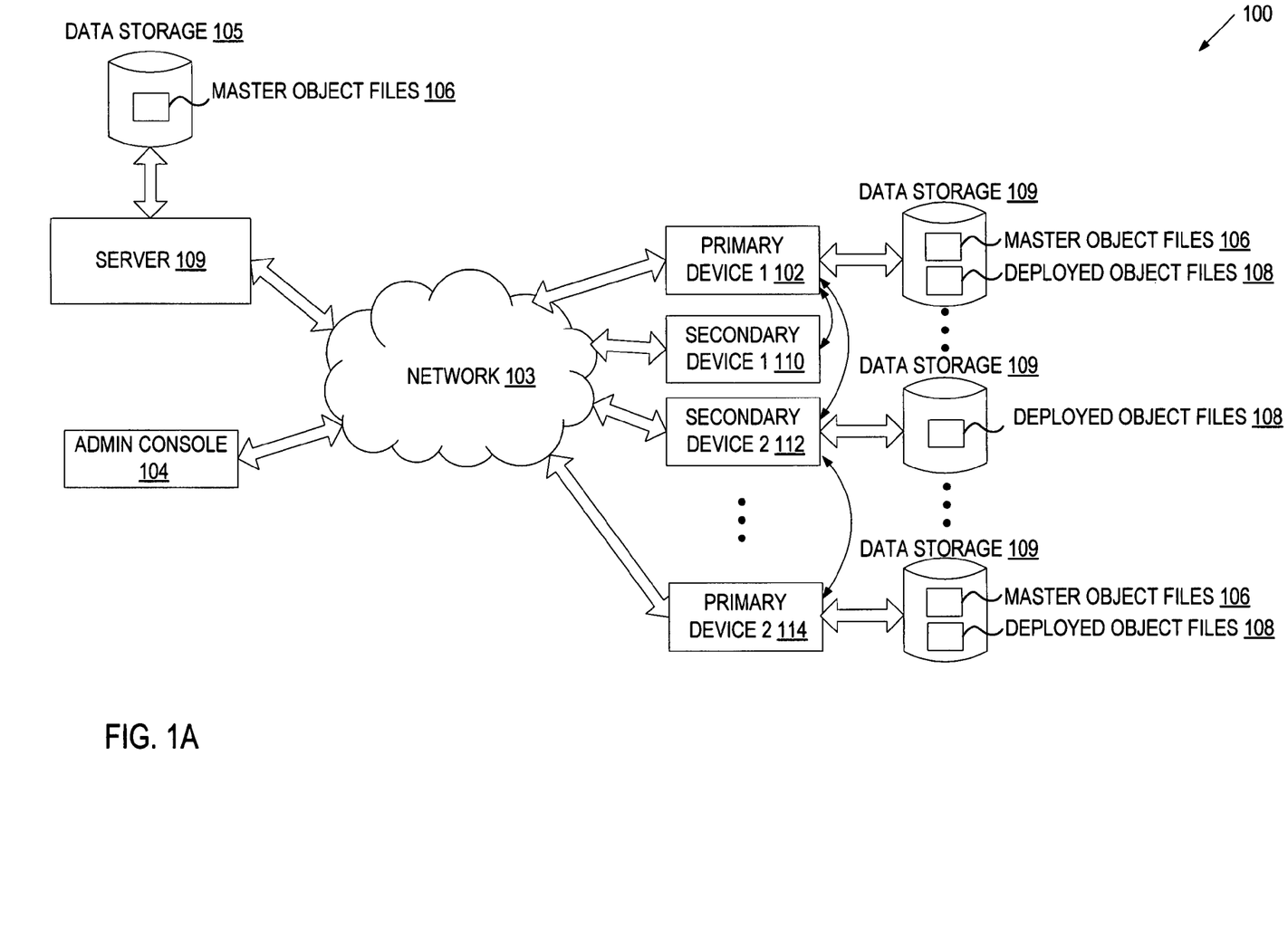
FIG. 1A illustrates a network architecture in which embodiments of the present invention may be implemented.

FIG. 1A illustrates an exemplary network architecture 100 in which embodiments of the present invention may operate. The network architecture 100 may include multiple client devices (including, for example, devices 102, 110, 112 and 114), a server 108 and a network 103. The client devices 102, 110, 112 and 114 may be, for example, personal computers (PCs), mobile phones, palm-sized computing devices, personal digital assistants (PDAs), network monitoring appliances, and the like. Each client device includes one or more hardware components, software components, or a combination of both, that are configurable.

The server 109 stores master data files 106 in data storage 105 for the client devices 102, 110, 112 and 114 as well as performing additional tasks that are application-specific. The master data files 106 may also be stored in internal memory or caches of the server 109. The server 109 may contain a server front end responsible for network communications, plugins for server functions (such as security administration), a basic directory tree containing server-related data, and a database back end plugin responsible for managing the storage and retrieval of data from the data storage 105. The data storage 105 may comprise mass storage devices, such as magnetic or optical storage based disks or tapes.

The client devices 102, 110, 112 and 114 are coupled to the server 109 via the network 103, which may be a public network (e.g., Internet) or a private network (e.g., Ethernet, a Local Area Network (LAN), or a corporate intranet). In one embodiment, the server 109 provides data objects to the client devices 102, 110, 112 and 114 to perform application-specific tasks. For example, the data object may be a policy object that specifies a set of security rules (e.g., rules that define a firewall) for the device. Alternatively, the data object may be a configuration object that includes a collection of configuration items for configuring the client devices 102, 110, 112 and 114. In one embodiment, each of the client devices includes a Web interface to allow a user (such as a system administrator at a remote console 104) to issue commands to the client device and to obtain data from the client device.

In one embodiment, the server 109 designates the client device 102 as a primary device and sends master object files 106 for all client devices managed by the server 109 to the primary device 102, which stores them in data storage 109. The primary device 102 extracts its own objects and stores them as deployed object files 108 in the same or different data storage.

When a secondary client device 110 requests updates for its data objects from the server 109, the server 109 directs the secondary device 110 to the primary device 102. The secondary device 110 resubmits its request to the primary device 102, receives updates for data objects currently deployed at the secondary device 110 from the primary device 102, and updates its deployed object files 108 accordingly. The secondary device 110 may then periodically request object updates from the primary device 102.

If, for some reason, the primary device 102 fails to respond to the secondary device 110, the secondary device 110 may send a request to the server 109, indicating that the primary device 102 is unavailable. The server 109 may respond by directing the secondary device 110 to another primary device (e.g., primary device 114), or if no other primary device currently exists, the server 109 may designate the secondary device 110 as a new primary device.

In some embodiments, the client devices 102, 110, 112 and 114 are part of an organization's network that may include desktop computers, laptop computers, network printers, switches, routers, gateways, firewalls, or any other devices having a network address. Each of the client devices 102, 110, 112 and 114 may represent a network appliance that is configurable over the network 103 to perform a network related function (e.g., network monitoring) upon connection with the organization network. The server 109 may use the network appliances to collect information about the organization network and devices on the organization network. In particular, the network appliances may collect current characteristics of the devices including characteristics of their hardware components, operating systems, databases, network services, applications, websites, etc. The server 109 may use this information to generate alerts and various reports for users such as IT administrators.

In one embodiment, the network architecture 100 also includes a signing authority (not shown) to facilitate secure communications between the server 109 and the client devices 102, 110, 112 and 114. In particular, each client device may have an identity certificate (also known as a digital certificate, signed certificate, public key certificate, etc.) issued by the certificate authority that has been digitally signed with the private key of the certificate authority. This identity certificate may be used by the client device to authenticate itself to the server 109 and other client devices that trust the certificate authority. In particular, each client's certificate (e.g., a X.509 certificate) may have the organization and customer ID embedded. A client device may verify its peer by ensuring that the peer's certificate is validly signed by the trusted certificate authority, and that the peer's certificate includes matching organization and customer ID. Both client devices may be performing the above operations simultaneously.

Figure 1B:
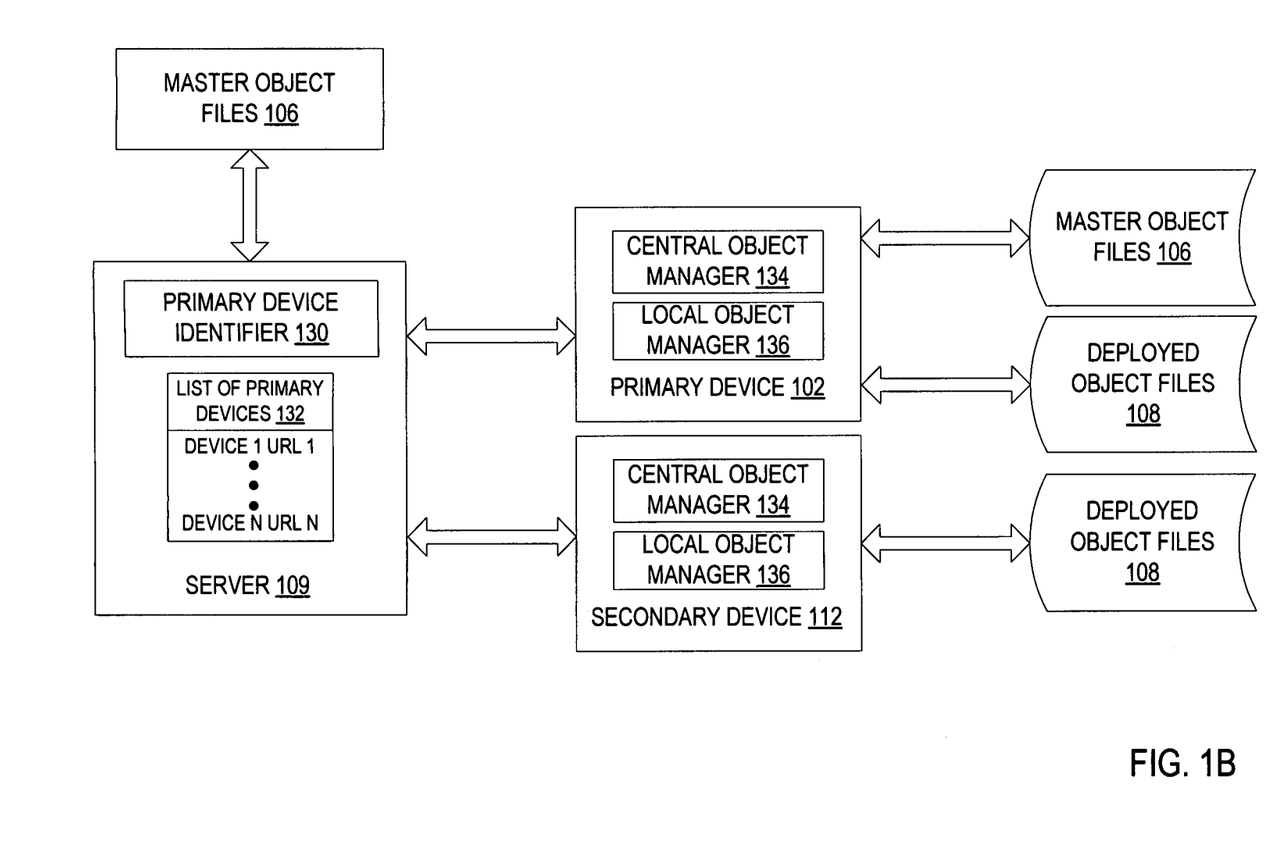
FIG. 1B is a block diagram illustrating distribution of objects according to some embodiments of the invention.

FIG. 1B is a block diagram illustrating distribution of objects according to some embodiments of the invention. Referring to FIG. 1B, server 109 hosts a primary device identifier 130 that maintains a list 132 of primary devices. The list 132 may be updated when the primary device identifier 130 designates a new primary device or removes an existing primary device. The primary device identifier 130 may designate a new primary device in response to receiving a request for object updates from a non-primary device, and determining that the list 132 is empty. Alternatively, the primary device identifier 130 may designate a requesting client device as a new primary device if the requesting client device indicates that the primary device(s) is unavailable. The primary device identifier 130 may remove a primary device from the list 132 upon determining that the primary device has been silent for a predefined time period (e.g., has not requested object updates for a predefined time period).

When the primary device identifier 130 designates a new primary device (e.g., primary device 102), it transmits master object files 106 to that primary device. The master object files 106 include objects for all primary and secondary devices managed by the server 109 (e.g., all network appliances operating on the organization network). The primary device 102 extracts its own object files and deploys them locally (deployed object files 108). The object files of other devices are stored as master object files 106.

The primary device 102 hosts a local object manager 136 that handles object files 108 of the primary device 102, and a central object manager 134 that handles master object files 106, periodically requests object updates for all devices from the server 109, and distributes object updates to secondary devices as will be discussed in more detail below.

A secondary device 112 hosts a local object manager 136 that requests object updates from the primary device 102 and updates the deployed object files 108 using the received updates. The secondary device 112 also includes a central object manager 134 but it remains inactivated until (if ever) the primary device identifier 130 designates the device 112 as a primary device. This may happen if the secondary device 112 reports to the primary device identifier 130 that the primary device 102 is unavailable and the list 132 does not include any other available primary devices. The primary device 102 may become unavailable if it goes down or is unable (or unwilling) to respond to the request of the secondary device 112. Being in a silent mode for a predefined time period causes the central object manager 134 to become inactivated, which in turn results in inability to respond to object update requests from secondary devices.

Figure 2:
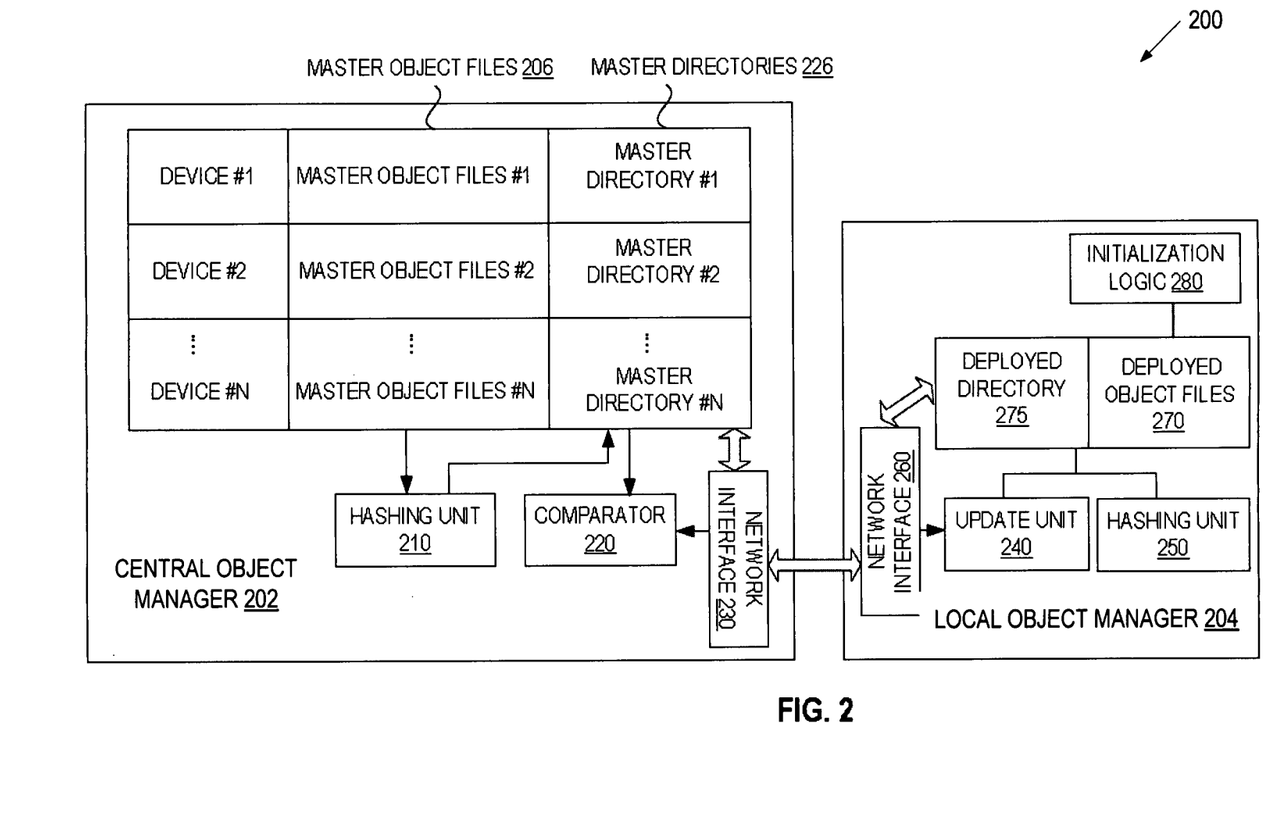
FIG. 2 illustrates a block diagram of one embodiment of a central object manager and a local object manager.

FIG. 2 illustrates a block diagram of one embodiment of a central object manager 202 hosted by a primary device and a local object manager 204 hosted by a secondary device. It is understood that the central object manager 202 and the local object manager 204 may include components for performing additional tasks that are unrelated to object distribution. For simplicity of the description, details that are not germane to the present invention are not shown.

The central object manager 202 receives master object files 206 from the server and stores them locally or on data storage accessible to the central object manager 202 via a network. The central object manager 202 periodically requests new master object files (or updates of master object files in another embodiment) from the server, and replaces currently stored master object files 206 with the newly received master object files (modifies the currently stored master object files 206 according to the received updates in another embodiment).

The master object files 206 include, for each device managed by the server, a list of the data objects to be deployed on the device according to what the device should have. Each data object is stored in one master data file 206, which can be identified by a compressed format (e.g., a master fingerprint) of the data object. That is, the master fingerprint can be used as a filename of that master data file 206. Each device is associated with a master directory 226, which contains a collection of the filenames for the data objects that the device should have. Thus, the data objects that a device should have can easily be determined by looking up the master directory 226 associated with the device.

Each data object corresponds to a data item in a transportable format, such as Extensible Mark-up Language (XML), JSON (Javascript Object Notation), Perl source code, or the like. When a new or modified data item is received, the corresponding data object is also created or updated in the master object file 206. When a data item is deleted from a device, its corresponding data object is removed from the master object file 206 for that device. Each data item includes a collection of rules, commands, configuration parameters, or other suitable data entries. The following is an example of a portion of a configuration object for configuring a network monitoring appliance in JSON:

```
a. {
b. "CHECK_COMMAND" : 2,
c. "CHECK_INTERVAL" : 10,
d. "CONTACT_GROUPS" : [
e. 14815
f. ],
g. "CUSTOMER_ID" : 3673,
h. "DESCRIPTION" : "Test HTTPS",
i. "MAX_ATTEMPTS" : 1,
j. "NETSAINT_ID" : 12480,
k. "NOTIFICATION_INTERVAL" : 15,
l. "NOTIFY_CRITICAL" : 0,
m. ......
n. }
```

In one embodiment, a master fingerprint can be generated by compressing the contents of a data object in the master object files 206. For example, the compression may be performed by a hashing unit 210, which hashes the list of data objects with a hash function (e.g., SHA-1, SHA-2, MD5, etc.). A hashed object is a compressed representation of the data object, and can be used as an identifier of that data object. The hashing unit 210 may serialize a data object into an alphanumeric string before applying the hash function. The central object manager 202 also includes a comparator 220 to compare deployed fingerprints received from one of the secondary devices with the master fingerprints for that device. Based on the differences detected by the comparator 220, the central object manager 202 retrieves the data objects corresponding to the differences from the device's master list. The central object manager 202 further includes a network interface 215 for receiving the deployed fingerprints from the local object manager 204 and for transmitting the data objects to the local object manager 204.

In one embodiment, the local object manager 204 stores deployed object files 270, which contains the objects currently deployed on the local object manager 204. Each deployed object file 270 contains a deployed data object, which can be identified by a deployed fingerprint associated with the deployed data object. The deployed fingerprint is generated by a hashing unit 250 that hashes the deployed data object with the same hashing function used by the central object manager 202. A deployed directory 275 contains the collection of deployed fingerprints (which can be used as filenames) associated with the data objects that the device currently has. The local object manager 204 also includes an update unit 240 for updating the deployed object file 270 using the data objects received from the central object manager 202. In one embodiment, the update unit 240 uses the code in the transportable data objects to generate data items that the local object manager 204 needs to have. The device further includes a network interface 260 for transmitting the deployed fingerprints to the central object manager 202 and for receiving the data objects from the central object manager 202. In some embodiments, the local object manager 204 also includes initialization logic 280 to provide initial data objects for the device upon device initialization.

In an alternative embodiment, the central object manager 202 and the local object manager 204 reside on the same primary device and communicate with each other using a mechanism discussed above (except that the communication may be direct rather than via a network) to facilitate updates of object files deployed on the primary device. In yet another embodiment, master object files 206 of the primary device are extracted from the master object files 206 to replace object files currently deployed at the primary device.

Figure 3:
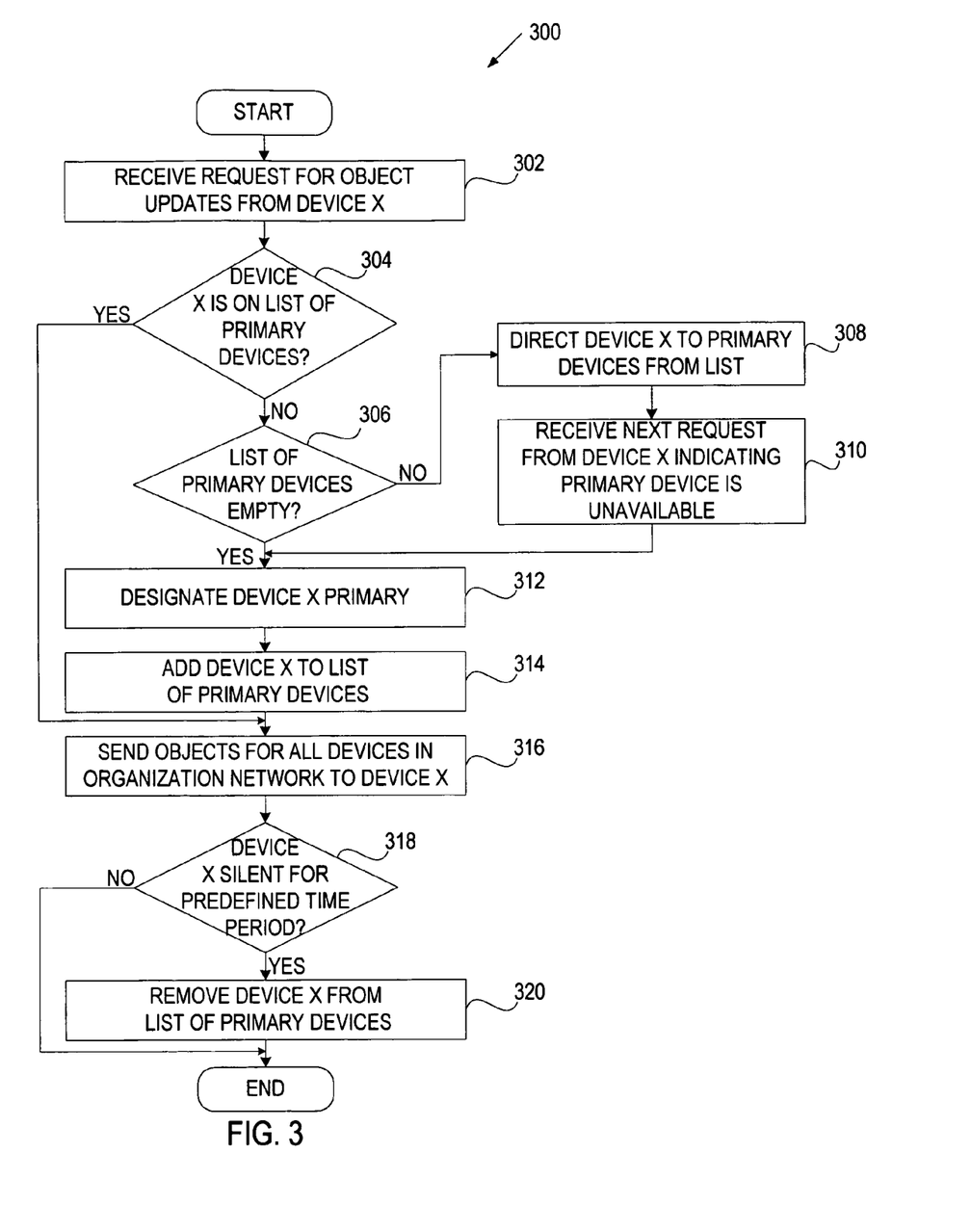
FIG. 3 illustrates a flow diagram of one embodiment of a server-side method for distributing data objects among devices of an organization.

FIG. 3 illustrates a flow diagram of one embodiment of a server-side method 300 for distributing data objects among devices of an organization. Method 300 may be performed by processing logic that may comprise hardware (e.g., circuitry, dedicated logic, programmable logic, microcode, etc.), software (such as instructions run on a processing device), or a combination thereof. In one embodiment, method 300 is performed by the server 109 of FIG. 1.

Referring to FIG. 3, at block 302, method 300 begins with processing logic receiving a request for data object updates from a client device X. At block 304, processing logic determines whether device X is on a list of primary devices. If so, processing logic proceeds to block 316. If not, processing logic determines whether the list of primary devices is empty. If the list of primary devices is empty, processing logic proceeds directly to block 312. If the list of primary devices specifies at least one primary device, processing logic directs device X to the primary device(s) from the list (e.g., by providing a URL(s) of the primary device(s)) at block 308. Subsequently, processing logic may receive a next request from device X, indicating that the primary device(s) is (are) unavailable (block 310), and may respond to this request by performing an operation of block 312.

At block 312, processing logic designates device X as a primary device. Next, processing logic adds device X to the list of primary devices (block 314) and sends objects for all devices managed by the server to device X (block 316). Alternatively, if device X is an existing primary device (i.e., determination made at block 304 is positive), processing logic identifies changes to the objects previously sent to device X, and sends only those changes to device X at block 316.

At block 318, processing logic determines whether device X has been silent for a predefined time interval. If not, method 300 ends. If so, processing logic removes device X from the list of primary devices (block 320), and then method 300 ends.

Figure 4:
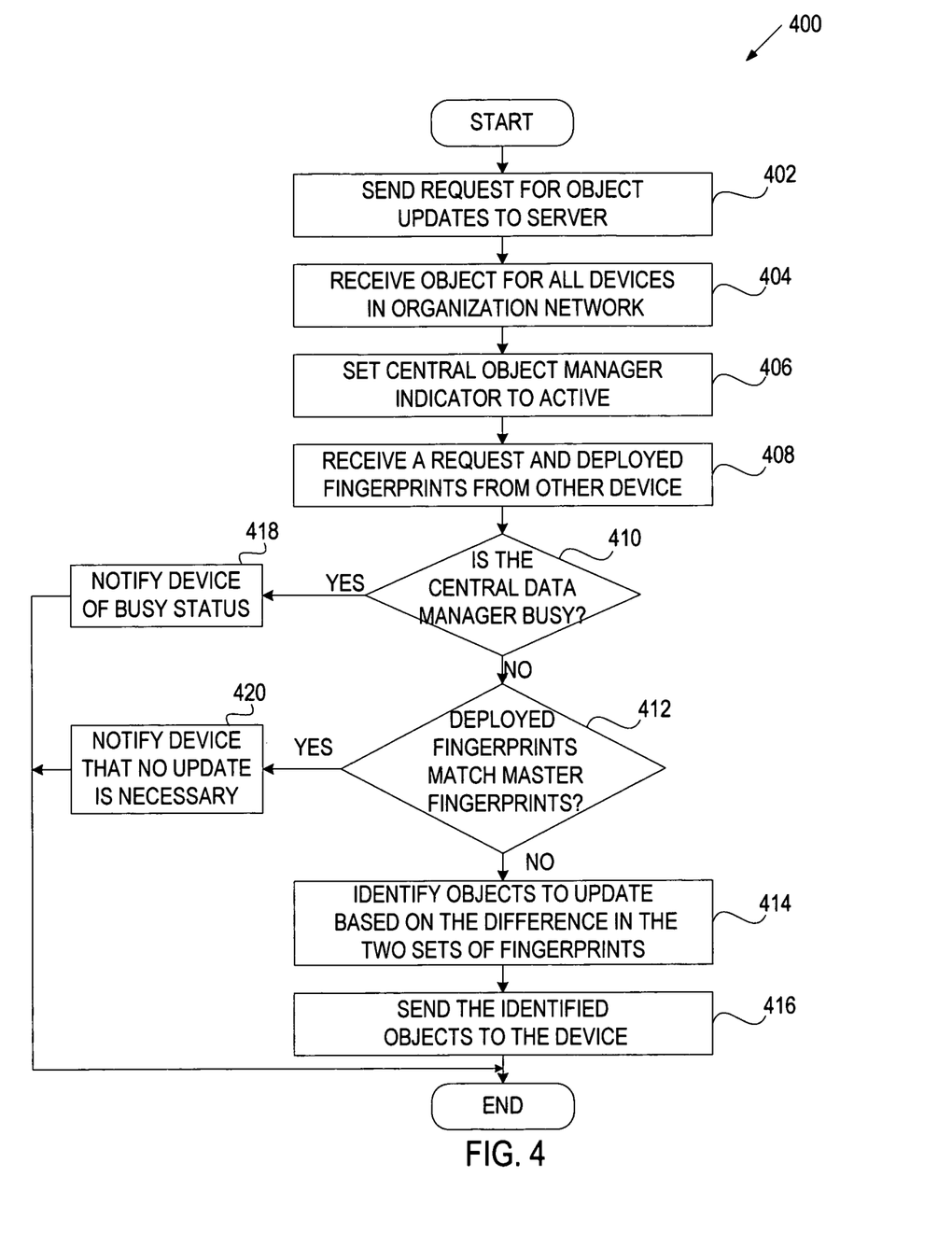
FIG. 4 illustrates a flow diagram of one embodiment of an object distribution method directed to a primary device functionality.

FIG. 4 illustrates a flow diagram of one embodiment of an object distribution method 400 directed to a primary device functionality. Method 400 may be performed by processing logic that may comprise hardware (e.g., circuitry, dedicated logic, programmable logic, microcode, etc.), software (such as instructions run on a processing device), or a combination thereof. In one embodiment, method 400 is performed by the primary device 102 of FIG. 1.

Referring to FIG. 4, method 400 begins with processing logic sending a request for object updates to a server at block 402 (while device 102 functions as a secondary device). At block 404, processing logic receives objects for all devices managed by a server in the organization network. At block 406, processing logic stores the objects as master object files and activates a central object manager.

At block 408, processing logic receives a request from another device (e.g., a secondary device 110). The request includes a list of deployed fingerprints for the data objects that are currently deployed on the secondary device. Processing logic first determines whether the central object manager is too busy to service the request (block 410). If so, processing logic continues to block 418 to notify the secondary device of the busy status, and ask the secondary device to call back at a later time. If the central object manager is not busy with other tasks, processing logic determines whether the deployed fingerprints match the master fingerprints maintained by the central object manager (block 412). It the fingerprints match, processing logic notifies the secondary device that no update is necessary (block 420). Method 400 then terminates.

Proceeding to block 414, if there is a difference between the two sets of fingerprints, processing logic determines one or more master fingerprints that do not correspond to any of the deployed fingerprints. For each of these master fingerprints, processing logic identifies, by looking up the device's associated master directory, a corresponding data object as needing to be added to the device. Processing logic also determines one or more deployed fingerprints that do not correspond to any of the master fingerprints. These deployed fingerprints can be used as identifiers of the objects that need to be deleted from the deployed object files. The differences between the two sets of fingerprints may be caused by data objects that have been changed, deleted, or added to the master object file. The differences may also be the result of device initialization, during which only a subset of the device's needed setting is provided by initialization logic locally resident on the device.

Proceeding to block 416, processing logic sends the identified data objects and, if any, identifiers (fingerprints) of the deployed objects to be deleted, to the secondary device that initiates the request. An example of the transmission format, in XML, may be:

```
a. <ObjectDelta>
   b. <NewObjects></NewObjects>
   c. <DeletedObjects></DeletedObjects>
d. </ObjectDelta>.
```

Either or both the NewObjects field and the DeletedObjects field can be empty if there is no object to add and/or delete. Method 400 then terminates. Method 400 may restart after a short interval, which is shorter than a normal poll interval for new data acquisition, but not immediately. The reason for waiting for a short interval before restarting method 400 is to reduce possible network congestion, for example, from a device with problems applying configuration objects (which can happen when a disk is failing).

Figure 5:
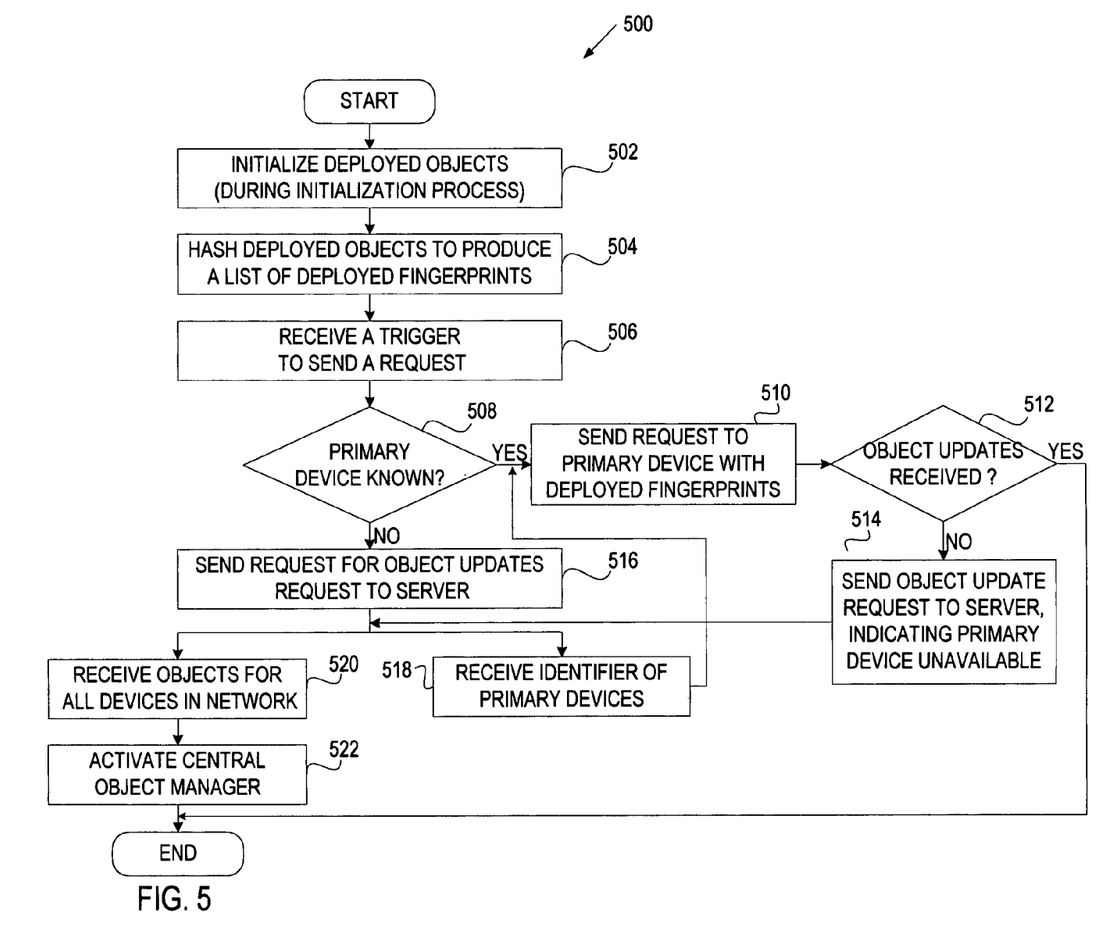
FIG. 5 illustrates a flow diagram of one embodiment of an object distribution method directed to a secondary device functionality.

FIG. 5 illustrates a flow diagram of one embodiment of an object distribution method 500 directed to a secondary device functionality. Method 500 may be performed by processing logic that may comprise hardware (e.g., circuitry, dedicated logic, programmable logic, microcode, etc.), software (such as instructions run on a processing device), or a combination thereof. In one embodiment, method 500 is performed by the secondary device 110 of FIG. 1.

Referring to FIG. 5, method 500 begins with processing logic initializing its setting using deployed data objects at block 502. In one embodiment, the initial deployed data objects may be determined by initialization logic (e.g., initialization logic 280) locally residing on the secondary device. The initial data objects may include just enough information for initializing the operations of the device, but may be insufficient to perform other application-specific tasks. At block 504, processing logic hashes the deployed data objects to produce a list of deployed fingerprints. At block 506, processing logic receives a trigger to send a request. The trigger may be part of the initialization sequence that allows the device 110 to complete its initialization. The trigger may be, alternatively, a command issued by an administrator via a Web interface of the device 110, a command issued by the central object manager, or a timer that periodically expires to cause the device 110 to poll the central object manager.

At block 508, processing logic determines whether a primary device is known (previously identified by the server). If not, processing logic sends a request for object updates to the server (block 516). If so, processing logic sends a request for object updates to the primary device, with the list of currently deployed fingerprints (block 510) and waits for a response. If a response with an update to the deployed data objects is received (block 512), processing logic updates the deployed object files based on the update, and method 500 ends. If processing logic does not receive a response from the primary device, processing logic sends a request for object updates to the server, indicating that the primary device is unavailable (block 514).

After sending a request to the server at block 514 or block 516, processing logic may either receive an identifier of a new primary device (block 518) and return to block 510, or it may receive objects for all devices managed by the server (block 52), indicating that the device 110 has been designated as a primary device, which causes processing logic to activate the central object manager (block 522).

Figure 6:
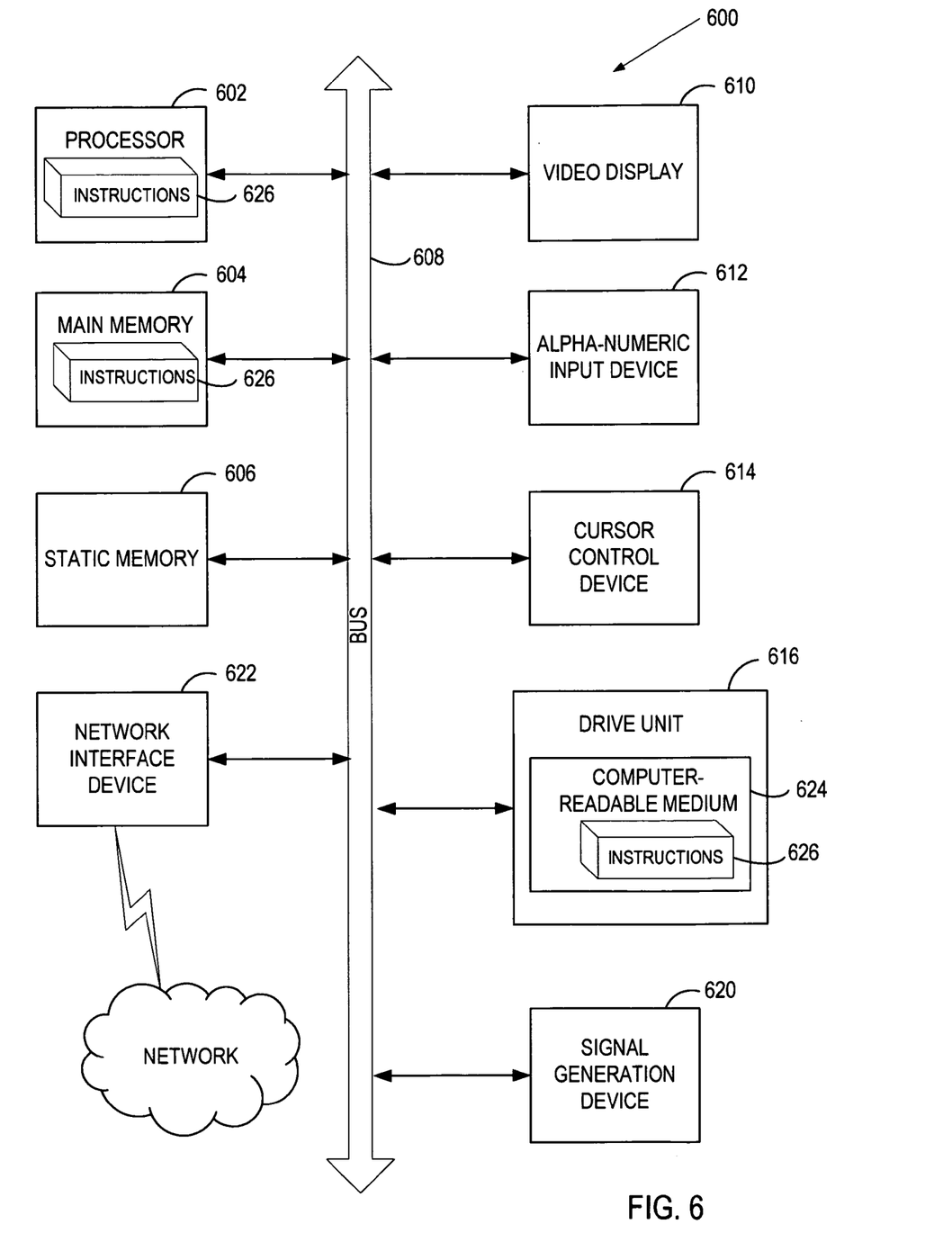
FIG. 6 illustrates a block diagram of an exemplary computer system implementing some embodiments of the present invention.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a device machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine.

Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processor 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 618 (e.g., a data storage device), which communicate with each other via a bus 630.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The secondary memory 618 may include a machine-readable storage medium (or more specifically a computer-readable storage medium) 631 on which is stored one or more sets of instructions (e.g., software 622) embodying any one or more of the methodologies or functions described herein. The software 622 may also reside, completely or at least partially, within the main memory 604 and/or within the processing device 602 during execution thereof by the computer system 600, the main memory 604 and the processing device 602 also constituting machine-readable storage media. The software 622 may further be transmitted or received over a network 620 via the network interface device 608.

The machine-readable storage medium 631 may also be used to store master object files and/or deployed object files (e.g., the master object files 106 and/or the deployed object files 270 of FIG. 2), and/or a software library containing methods performed by the data manager 108 and/or devices 102. While the machine-readable storage medium 631 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

Thus, a method and system for efficiently distributing data objects over a network have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A computer-implemented method for a primary client device, the method comprising:
    sending, to a server, a request for updates of objects deployed at the primary client device;
    receiving, from the server, a plurality of objects to be deployed at a plurality of client devices managed by the server, the plurality of client devices comprising the primary client device and a set of secondary client devices, wherein the primary client device is to store the plurality of objects to be deployed at the plurality of client devices, and each secondary client device in the set of secondary client devices is to store a subset of objects of the plurality of objects, the subset of objects to be deployed at a corresponding secondary client device and comprising objects not to be deployed at other secondary client devices managed by the server;
    storing, at the primary client device, the subset of objects for the corresponding secondary client device and fingerprints of objects from the subset in a master object file for the corresponding secondary client device;
    receiving a request for object updates from the corresponding secondary client device, the received request comprising fingerprints of objects currently deployed at the corresponding secondary client device;
    determining fingerprint differences between the fingerprints of objects currently deployed at the corresponding secondary client device and the fingerprints in the master object file stored at the primary client device;
    identifying, based on the fingerprint differences, objects to be added to the corresponding secondary client device, and
    sending the identified objects to the corresponding secondary client device.

2. The method of claim 1, further comprising:
    periodically requesting updates for the objects to be deployed at the plurality of client devices.

3. The method of claim 1, wherein the objects comprise at least one of policy objects and configuration objects.

4. The method of claim 1, wherein determining fingerprint differences comprises:
    determining whether the fingerprints of the objects currently deployed at the corresponding secondary client device match the fingerprints in the master object file stored at the primary client device; and
    if a match is not found, identifying objects that have different fingerprints.

5. A computer-implemented method for a secondary client device, the method comprising:
    sending, to a server, a request for updates of objects deployed at the secondary client device, wherein the server manages a plurality of client devices comprising a primary client device and the secondary client device;
    receiving, from the server, an identifier of the primary client device, wherein the primary client device is to store objects deployed at the plurality of client devices managed by the server, and the secondary client device is to store objects deployed at the secondary client device, the objects deployed at the secondary client device comprise objects not deployed at other secondary client devices managed by the server;
    sending, to the primary client device, a request for updates of objects deployed at the secondary client device, the request comprising fingerprints of the objects deployed at the secondary client device; and
    receiving, from the primary client device and based on a fingerprint difference between the objects deployed at the secondary client device and the objects stored at the primary client device, objects to be added to the secondary client device.

6. The method of claim 5, further comprising:
    determining that the primary client device is not available; and
    sending, to the server, the request for updates of objects deployed at the secondary client device, the request indicating that the primary client device is not available.

7. The method of claim 5 further comprising:
    receiving, from the server, an identifier of another primary client device;
    sending, to the other primary client device, the request for updates of objects deployed at the secondary client device.

8. The method of claim 5, further comprising:
    receiving, from the server, objects to be deployed at the plurality of client devices; and
    acting as the primary client device for other devices from the plurality of client devices.

9. A computer-implemented method for a server, the method comprising:
    receiving, from a client device of a plurality of client devices managed by the server, a request for updates of objects deployed at the client device;
    determining whether the client device is a primary client device or a secondary client device, wherein the primary client device is to store objects deployed at the plurality of client devices managed by the server, and the secondary client device is to store objects deployed at the secondary client device, the objects deployed at the secondary client device comprise objects not deployed at other secondary client devices managed by the server;
    when the client device is the primary client device, sending, to the client device, objects to be deployed at the plurality of client devices, the plurality of client devices comprising the primary client device and the secondary client device; and
    when the client device is the secondary client device, directing the client device to the primary client device.

10. The method of claim 9, further comprising:
    after directing the client device to the primary client device, receiving a next request from the client device, the request indicating that the primary client device is unavailable;
    determining whether any other client device has been designated as the primary client device;
    if another client device has been designated as the primary client device, directing the requesting client device to the other primary client device; and
    if no other client device has been designated as the primary client device, designating the requesting client device as the primary client device, and sending objects to be deployed at the plurality of client devices to the requesting client device.

11. The method of claim 9, further comprising:
determining that the primary client device has been silent for a predefined time period; and
removing the primary client device from a list of primary client devices.

12. A system comprising:
at least one primary network device, and
a plurality of secondary network devices coupled to the primary network device via a network,
wherein the primary network device is to receive objects for the plurality of secondary network devices from a server, and the plurality of secondary network devices are to receive an identifier of the primary network device from the server and to request updates for objects deployed at individual secondary network devices from the primary network device, wherein the primary network device is to store objects deployed at the primary network device and the plurality of secondary network devices, and each secondary client device is to store objects deployed at a corresponding secondary network device, the objects deployed at the corresponding secondary network device comprise objects not deployed at other secondary network devices; and
wherein the corresponding secondary network device is to send, to the primary network device, a request for updates of objects deployed at the corresponding secondary network device, the request comprising fingerprints of the objects deployed at the corresponding secondary network device, and to receive, from the primary network device and based on a fingerprint difference between objects deployed at the corresponding secondary network device and objects at the primary network device, objects to be added to the corresponding secondary network device.

13. The system of claim 12, wherein the primary network device is further to periodically request updates for the objects to be deployed at the plurality of secondary network devices, and to determine a difference between the objects deployed at the corresponding secondary network device and objects received from the server for the corresponding secondary network device.

14. The system of claim 12, wherein the objects comprise at least one of policy objects and configuration objects.

15. The system of claim 12, wherein one of the plurality of secondary network devices is to determine that the primary network device is not available, to send, to the server, a request for updates of objects deployed at a respective secondary network device, the request indicating that the primary network device is not available, to receive, from the server, an identifier of another primary network device, and to send to the other primary network device, a request for updates of objects deployed at the respective secondary network device.

16. The system of claim 12, wherein one of the plurality of secondary network devices is to receive, from the server, objects to be deployed at a plurality of network devices, and to act as the primary network device for other devices from the plurality of network devices.

17. A non-transitory computer readable storage medium including instructions that, when executed by a processing system, cause the processing system to perform a method comprising:
sending, to a server, a request for updates of objects deployed at the primary client device;
receiving, from the server, objects to be deployed at a plurality of client devices managed by the server, the plurality of client devices comprising the primary client device and a set of secondary client devices, wherein the primary client device is to store objects deployed at the plurality of client devices, and each secondary client device in the set of secondary client devices is to store objects deployed at a corresponding secondary client device, the objects deployed at the corresponding secondary client device comprise objects not deployed at other secondary client devices managed by the server;
storing, at the primary client device, a subset of objects for the corresponding secondary client device and fingerprints of objects from the subset in a master object file for the corresponding secondary client device;
receiving a request for object updates from the corresponding secondary client device, the received request comprising fingerprints of objects currently deployed at the corresponding secondary client device;
determining fingerprint differences between the fingerprints of objects currently deployed at the corresponding secondary client device and the fingerprints in the master object file stored at the primary client device;
identifying, based on the fingerprint differences, objects to be added to the corresponding secondary client device, and
sending the identified objects to the corresponding secondary client device.

18. The non-transitory computer readable storage medium of claim 17, wherein the method further comprises:
periodically requesting updates for the objects to be deployed at the plurality of c lent devices.

19. The non-transitory computer readable storage medium of claim 17, wherein the objects comprise at least one of policy objects and configuration objects.

20. The non-transitory computer readable storage medium of claim 17, wherein determining fingerprint differences comprises:
determining whether fingerprints of the objects deployed at the corresponding secondary client device match fingerprints of the objects received from the server for the corresponding secondary client device receiving; and
if a match is not found, identifying objects that have different fingerprints.

* * * * *

UNITED STATES PATENT AND TRADEMARK OFFICE
CERTIFICATE OF CORRECTION

| | | |
|---|---|---|
| PATENT NO. | : 8,560,732 B2 | Page 1 of 1 |
| APPLICATION NO. | : 12/070644 | |
| DATED | : October 15, 2013 | |
| INVENTOR(S) | : John P. Schneider | |

It is certified that error appears in the above-identified patent and that said Letters Patent is hereby corrected as shown below:

In the Claims

In claim 18, column 14, line 43, delete "c lent" and insert --client--.

Signed and Sealed this
Fifteenth Day of April, 2014

Michelle K. Lee
*Deputy Director of the United States Patent and Trademark Office*